United States Patent [19]

Thomas, Jr. et al.

[11] 3,927,081
[45] Dec. 16, 1975

[54] PURIFICATION OF CRUDE SULFONIC ACIDS

[75] Inventors: Samuel Charles Thomas, Jr., Prospect Park; Vincent Jay Cease, Aston, both of Pa.

[73] Assignee: Continental Oil Company, Ponca City, Okla.

[22] Filed: Feb. 26, 1973

[21] Appl. No.: 333,857

[52] U.S. Cl. ........ 260/505 P; 260/504 S; 260/513 R
[51] Int. Cl.² ........................................ C07C 143/24
[58] Field of Search .......... 260/504 S, 513 R, 505 P

[56] References Cited
UNITED STATES PATENTS 2,168,315   8/1939   Blumer ............................. 260/504
3,083,146   3/1963   Sweeney et al. ..................... 260/505

Primary Examiner—James O. Thomas, Jr.
Assistant Examiner—A. Siegel
Attorney, Agent, or Firm—Bayless E. Rutherford, Jr.

[57] ABSTRACT

A method of purifying crude, oil-soluble sulfonic acids is disclosed, wherein the method comprises contacting a volatile hydrocarbon solution of crude, oil-soluble sulfonic acids with 2-methoxyethanol or a mixture of water and 2-methoxyethanol. Primarily, the term "purifying" means removal of sulfuric acid and sulfur oxides.

12 Claims, No Drawings

PURIFICATION OF CRUDE SULFONIC ACIDS

BACKGROUND

Oil-soluble sulfonic acids are important products of present day commerce, in that the metal salts thereof have many uses. For example, they can be used as lubricating oil additives and rust inhibitors. The overbased metal sulfonates are particularly useful as additives for internal combustion lubricants and marine diesel lubricants.

Customarily, the oil-soluble sulfonic acids are prepared by treating a suitable hydrocarbon with fuming sulfuric acid or sulfur trioxide. Since an exces of sulfonating agent is used, the crude sulfonic acids usually contain a minor amount of sulfuric acid. Unless the sulfuric acid is substantially removed, the metal sulfates resulting from the conversion of the sulfonic acid to the metal sulfonate have an adverse effect on the quality of the metal sulfonates. Because of this, various means have been used to remove the sulfuric acid. An example of a method of removing sulfuric acid is the treating of the crude sulfonic acid with lime. Unfortunately, this method has several disadvantages, such as requiring disposal of excess lime, calcium sulfate and the filter cake. Other methods of removing sulfuric acid and thereby purifying crude sulfonic acid will be described in connection with the prior art.

In addition to sulfuric acid, the crude oil-soluble sulfonic acids often contain objectionable amounts of sulfur oxide gases (e.g., $SO_2$ and $SO_3$). It is desirable that the method of purifying the crude sulfonic acids also remove a substantial amount of these sulfur oxides.

We have discovered a method of purifying crude oil-soluble sulfonic acids which has the following advantages:
a. simple and inexpensive
b. completely effective
c. non-polluting
d. removes substantial amounts of sulfur oxides

PRIOR ART

A search of the prior art was conducted by a Washington associate in order to ascertain the nature of the art related to this invention. From the search the following U.S. patents are believed to be the most pertinent:

U.S. Pat. No. 2,168,315 teaches a process for purifying mahogany sulfonic acids or mahogany sulfonates which use a wide variety of polar solvents, including 2-methoxyethanol. According to the process of this patent, the pH of the admixture should be controlled within certain limits.

U.S. Pat. No. 3,225,086 teaches a process for purifying mahogany sulfonic acids wherein, basically, the process comprises treating with methanol followed by treating with a calcium base.

U.S. Pat. No. 2,406,763 teaches a process for purifying oil-soluble sulfonic acids wherein the process uses a lower aliphatic alcohol, e.g., methanol.

In addition to the above-mentioned patents, the search developed the following U.S. Pat. Nos., which are no more pertinent than those discussed: 518,989; 1,228,414; 2,125,414; 2,125,189; 2,280,118; 2,334,532; 2,373,793; 2,456,119; 2,652,427; 3,240,801; and 3,591,627.

According to the Washington associate, the search covered:
Class 210, Subclass 21
Class 260, Subclasses 504S, 505P, 513,703, and 705.

The invention described and claimed herein is believed patentable over the prior art considered for the following reasons:
a none of the prior art recognized that 2-methoxyethanol or mixture of 2-methoxyethanol and water were superior to other polar solvents in purifying crude, oil-soluble sulfonic acids,
b none of the prior art recognized that use of the amounts of 2-methoxyethanol or mixtures of water and 2-methoxyethanol described herein give superior results,
c none of the prior art recognized that superior results were obtained by a combination of (i) a heating step as described herein and (ii) 2-methoxyethanol or mixtures of 2-methoxyethanol and water.

BRIEF SUMMARY OF THE INVENTION

Broadly stated, the present invention is directed to a method of purifying crude, oil-soluble sulfonic acids by contacting a volatile, non-aromatic hydrocarbon solution of crude, oil-soluble sulfonic acids with a minor, but effective, amount of a polar solvent which is 2-methoxyethanol or a mixture of water and 2-methoxyethanol.

More specifically, the method of the present invention is directed to removing sulfuric acid and sulfur oxides from crude, oil-soluble sulfonic acids wherein the method comprises:
a adding to a volatile, non-aromatic hydrocarbon solution of crude sulfonic acids a minor, but effective, amount of a polar solvent which is 2-methoxyethanol or a mixture of 2-methoxyethanol and water,
b agitating the admixture of step (a),
c allowing the admixture to settle, thereby forming a phase containing sulfuric acid and a phase containing the hydrocarbon solution oil-soluble sulfonic acids,
d recovering the phase containing the hydrocarbon solution oil-soluble sulfonic acids, and
e heating the desired recovered phase to remove a small amount (e.g., 1–10 volume percent) of the volatile materials (which are predominantly hydrocarbons).

In some instances step (e) can be inserted ahead of step (c).

The important features of our invention are the amount of polar solvent which is used and the type of polar solvent used.

DETAILED DESCRIPTION

Our process is restricted to the oil-soluble sulfonic acids. The oil-soluble sulfonic acid can be a mahogany, or natural, sulfonic acid or be derived from synthetic hydrocarbon sulfonation stocks. In order to be considered oil-soluble, generally requires that the hydrocarbon portion of the sulfonic acid have a molecular weight between 350 and 1,000. Preferably, the hydrocarbon portion of the sulfonic acid has a molecular weight between about 400 and 700.

Particularly suitable oil-soluble sulfonic acids are derived from alkaryl hydrocarbons having the required molecular weight. The aryl moiety of the alkaryl hydrocarbon can be derived from benzene, toluene, xylene, or naphthalene, with benzene being preferred. The alkaryl hydrocarbon can be mono or di-substituted as long as the requirement for molecular weight is met. The alkyl groups can be either straight or branched-chain. Preferably, the alkyl groups are straight-chain when the aryl compound is di-substituted, since di-n-alkaryl hydrocarbons sulfonate much better than do the di-branched chain alkaryl hydrocarbons.

Specific examples of particularly suitable sulfonic acids include those derived from the following hydrocarbons: Postdodecylbenzene, which is described in many U.S. patents, for example, U.S. Pat. No. 3,150,088; Dimer alkylate, which is substantially a long-chain monoalkaryl and is described in U.S. Pat. No. 3,410,925; "NAB Bottoms" which contains a substantial amount of di-n-alkaryls and is described in British specification No. 1,146,935.

It should be emphasized that the process of our invention is suitable for removing sulfuric acid from any oil-soluble sulfonic acid. Moreover, it is believed that the term "oil-soluble sulfonic acid" is sufficiently well-known in the art that further description thereof is unnecessary.

Oil-soluble sulfonic acids are usually prepared by treating the desired hydrocarbons with a sulfonating agent (such as oleum or $SO_3$). This is followed by a phase split to remove the sludge containing the unreacted sulfuric acid. As indicated previously, the sulfonic acid layer at this point contains a considerable quantity of sulfuric acid and minor amounts of sulfur oxides. In order to facilitate a better separation and removal of more sulfuric acid, usually a volatile, nonaromatic hydrocarbon solvent is added to the sulfonation mass prior to taking the phase split.

The term "crude sulfonic acids," as used herein, refers to oil-soluble sulfonic acids containing a significant amount (which will be defined later) of sulfuric acid and minor amounts of other impurities (e.g., sulfur oxides).

The crude sulfonic acids are present in a volatile, nonaromatic hydrocarbon solvent, having a boiling point below about 150°C. Examples of suitable volatile hydrocarbon solvents include heptane, hexane and petroleum naphtha, with hexane being preferred.

Our invention is restricted to the use of 2-methoxyethanol and mixtures of water and 2-methoxyethanol as the polar solvent. Suitable mixtures of water and 2-methoxyethanol include those containing from about 15 to about 85 volume percent 2-methoxyethanol. Preferably, the mixtures contain from about 25 to about 75 volume percent 2-methoxyethanol. We have found that these materials unexpectedly give superior results to polar solvents such as methanol, ethanol, isopropanol, water per se and 2-butoxyethanol.

2-Methoxyethanol is available commercially under the trademark methyl "Cellosolve" from Union Carbide Corp.

A significant feature of our invention is that the amount of the polar solvent is important. In order to obtain acid ratios (to be defined later) which are particularly good (or close to optimum), it is preferred that the amount of polar solvent be from about 0.5 to about 1 volume percent. Where higher acid ratios are satisfactory, the upper amount of polar solvent can be increased to 2 volume percent. Where even higher acid ratios are satisfactory, the amount of polar solvent is from about 0.25 to about 5 volume percent. In all instances, the amount of polar solvent is based on the amount of volatile hydrocarbon solution containing the crude sulfonic acids.

In conducting the method of our invention, we have found the following procedure to be suitable:

a. The required amount of polar solvent is added to the volatile hydrocarbon solution containing the crude sulfonic acids, b. The admixture of step (a) is agitated. The degree of agitation required can readily be determined by those skilled in this art;

c. The admixture is then allowed to settle, with the time required being sufficient to obtain two phases. In the laboratory the required time has been a minimum of one hour with four hours being more suitable. Longer times may be required in plant-size operations. Again, the required time for settling can readily be determined by those skilled in this art. One phase (the upper) contains the desired oil-soluble sulfonic acids while the other phase contains the sulfuric acid, d. Recovering the phase containing the hydrocarbon solution of oil-soluble sulfonic acids.

e. Heating the desired recovered phase to remove a small amount of the volatile materials present. (The volatile materials removed are predominantly hydrocarbons.)

In the plant preferably the heating step is the last step. In other cases (e.g., in the laboratory) this heating step can be inserted before step (c). The temperature to which heated is dependent on the volatile hydrocarbon solvent employed. Usually, this temperature is in the range of about 60 to about 77°C, preferably about 68 to about 74°C. The purpose of this heating step is to remove substantial amounts of the sulfur oxides present. Knowing this, any person skilled in this art can readily determine the degree of heating required. Usually, heating long enough to remove from about 1 to about 10 volume present of the volatile materials is sufficient. Preferably, the heating time is that required to remove from about 2 to about 5 volume percent of the volatile materials.

In this connection, it should be noted that heating is more effective than blowing with inert gases or vacuum degassing in removal of the sulfur oxides. Also, and more importantly, it should be noted that use of the polar solvents of our invention is more effective than other polar solvents in combination with the heating step.

As used herein, the term "acid ratio" ("A.R.") refers to the percent sulfuric acid based on 100 percent active sulfonic acid.

In order to disclose the nature of the present invention still more clearly the following examples, both illustrative and comparative, will be given. It is to be understood, however, that the invention is not to be limited to the specific condition or details set forth in these examples, except insofar as such limitations are specified in the appended claims.

EXAMPLE 1

This example shows that 2-methoxyethanol is superior to water alone and methanol. It also illustrates the importance of using an optimum amount of the 2-methoxyethanol.

The crude sulfonic acid was prepared from an alkylate which was a mixture of the following: (a) a monoalkylbenzene wherein the alkyl group is derived from an α-olefin containing 20 to 40 carbon atoms and (b) a material containing a major amount of di-n-$C_{10}$-$C_{15}$ alkylbenzenes and a minor amount of trialkylsubstituted tetrahydronaphthalenes.

The crude sulfonic acid was in hexane solvent, contained 30 percent sulfonic acid and had an acid ratio of 8.5.

The procedure was as follows:
a. add the designated amount of the named polar solvent to the hexane solution of crude sulfonic acid,
b. agitate for 15 minutes,
c. heat to 68°–74°C and remove about 4 volume percent of the volatile solvents,
d. settle for 1 to 4 hours to produce a phase split, and
e. recover the desired phase containing the oil-soluble sulfonic acids.

The results using 2-methoxyethanol, water and methanol were as follows:

| Amount | Final Acid Ratio | | |
|---|---|---|---|
| (% by Vol.) | 2-Methoxyethanol | Water | Methanol |
| 0.25 | 1.0 | 1.8 | 2.5 |
| 0.50 | 0.4 | 1.3 | 1.5* |
| 0.75 | 0.3* | 1.1 | 1.5 |
| 1.00 | 0.5 | 0.8* | 1.6 |
| 1.50 | 0.09 | 1.0 | 2.0 |
| 2.00 | 1.5 | 1.4 | 2.6 |
| 5.00 | 2.5 | 2.3 | 2.9 |

*Optimum

EXAMPLE 2

| | | | | | |
|---|---|---|---|---|---|
| % Sulfonic Acid | 30 | 35 | 40 | 45 | 50 | 55 | 60 | 65 |
| % A.R. (Initial) | 10.0 | 10.5 | 11.0 | 11.5 | 13.0 | 14.0 | 15.5 | 17.0 |
| % M.C.* | 0.75 | 0.90 | 1.1 | 1.3 | 1.6 | 1.9 | 2.3 | 2.7 |
| % A.R. (Final) | 0.3 | 0.4 | 0.7 | 0.6 | 0.8 | 1.0 | 0.9 | 1.0 |

*2-methoxyethanol

This example shows the following: (a) 50:50 and 25:75 mixtures of 2-methoxyethanol-water give results equivalent to 2-methoxyethanol alone and (b) both 2-methoxyethanol and water-2-methoxyethanol mixtures give superior results to methanol or water per se.

The crude sulfonic acid was the same as in Example 1.

The amount of polar solvent was 0.75 percent by volume.

The procedure was the same as in Example 1, except the settling time was 16 hours.

| Blend No. | 1 | 2 | 3 | 4 | 5 |
|---|---|---|---|---|---|
| % 2-Me-EtOH* | 100 | 50 | 25 | 50 | 25 |
| % Methanol | — | — | — | 50 | 75 |
| % Water | — | 50 | 75 | — | — |
| Acid Ratio | 0.4 | 0.5 | 0.4 | 1.1 | 1.4 |

| Blend No. | 6 | 7 | 8 | 9 |
|---|---|---|---|---|
| % 2-Me-EtOH* | — | — | — | — |
| % Methanol | 100 | 50 | 75 | — |
| % Water | — | 50 | 25 | 100 |
| Acid Ratio | 1.8 | 0.9 | 1.4 | 0.8 |

*=2-methoxyethanol

EXAMPLE 3

This example shows that 2-methoxyethanol is effective in producing products having a low acid ratio when the acid ratio of the crude sulfonic acid varies over a wide range.

The crude sulfonic acid was a hexane solution similar to that of Example 1, except the acid ratio varied.

The procedure was the same as in Example 1, except that the amount of 2-methoxyethanol was constant at 0.75 volume percent in all of the runs.

The results were as follows:

| Initial Acid Ratio, % | 3.0 | 5.0 | 7.0 | 9.0 | 11.0 | 13.0 |
|---|---|---|---|---|---|---|
| Final Acid Ratio, % | 0.2 | 0.4 | 0.3 | 0.5 | 0.4 | 0.9 |

EXAMPLE 4

This example shows the effectiveness of 2-methoxyethanol in reducing the acid ratio in crude sulfonic acids containing varying amounts of sulfonic acid (from 30 to 65 percent) and having varying acid ratios (from 10.0 to 17.0).

The procedure was the same as that described in Example 1, except that varying amounts of 2-methoxyethanol were used.

The results were as follows:

EXAMPLE 5

This example shows that 2-methoxyethanol gives superior results to other alcohols as the polar solvent when used in the method of our invention. The example also shows that 2-methoxyethanol gives superior results when the heating step is used and when it is not used.

A hexane solution of crude sulfonic acid similar to that of Example 1 was used; it contained 28.5 percent sulfonic acid and had an acid ratio of 10.5

The procedure used was similar to that of Example 1. The amount of polar solvent was 1 volume percent in all runs.

In addition to 2-methoxyethanol, the following were tested: 2-butoxyethanol, ethanol and isopropanol.

The results were as follows:

| Polar Solvent | 2-Methoxy-ethanol | 2-Butoxy-ethanol | Ethanol | Isopropanol |
|---|---|---|---|---|
| Acid Ratio No heating step | 3.2 | 5.2 | 5.1 | 5.4 |
| Acid Ratio With heating step | 1.2 | 2.8 | 3.1 | 2.4 |

EXAMPLE 6

This example shows that heating to remove a small amount of volatiles in combination with 2-methoxyethanol treatment gives better products than does blowing with an inert gas or vacuum degassing, in combination with 2-methoxyethanol treatment.

The acid used was a hexane solution containing about 30 percent sulfonic acid. The procedure was the same as in Example 1, except that blowing with an inert gas (88 percent $N_2$, 12% $CO_2$) and vacuum degassing were used instead of the heating step in 2 runs.

The results were as follows:

|  | Heating | Method Blowing Inert Gas | Vacuum Degas |
| --- | --- | --- | --- |
| Series A - 2.8% Initial Acid Ratio |  |  |  |
| Final Acid Ratio | 0.3 | 0.5 | 0.4 |
| Odor | not detectable | pungent | very slightly pungent |
| Series B - 3.5% Initial Acid Ratio |  |  |  |
| Final Acid Ratio | 0.7 | 1.1 | 0.9 |
| Odor | very slightly pungent | pungent | slightly pungent |
| Series C - 2.2% Initial Acid Ratio |  |  |  |
| Final Acid Ratio | 0.1 | 0.7 | 0.4 |
| Odor | not detectable | pungent | pungent |

Thus, having described the invention in detail, it will be understood by those skilled in the art that certain variations and modifications may be made without departing from the spirit and scope of the invention as defined herein and in the appended claims.

We claim:

1. A method for purifying crude oil-soluble sulfonic acids, whereby sulfuric acid and sulfur oxides are removed therefrom, wherein the method comprises contacting a volatile, non-aromatic hydrocarbon solution of crude oil-soluble sulfonic acids with an effective amount, in the range of from about 0.25 to about 5 volume percent, based on the hydrocarbon solution of crude sulfonic acid, of 2-methoxyethanol or a mixture of 2-methoxyethanol and water which mixture contains from about 15 to about 85 volume percent 2-methoxyethanol, said volatile hydrocarbon boiling below about 150°C.

2. The method of claim 1 wherein (1) the amount of 2-methoxyethanol or mixture of 2-methoxyethanol and water is from about 0.5 to about 2 volume percent and (2) the volatile hydrocarbon solvent is hexane, 3. A method of purifying crude oil-soluble sulfonic acids, whereby sulfuric acid and sulfur oxides are removed therefrom, wherein the method comprises:
   a. adding to a volatile, non-aromatic hydrocarbon solution of crude oil-soluble sulfonic acids an effective amount, in the range of from about 0.25 to about 5 volume percent, based on said hydrocarbon solution of crude sulfonic acids, of 2-methoxyethanol or a mixture of 2-methoxyethanol and water which mixture contains from about 15 to about 85 volume percent 2-methoxyethanol,
   b. agitating the admixture of step (a),
   c. heating the admixture of step (b) sufficiently to remove therefrom from about 1 to about 8 volume percent of the volatile materials,
   d. allowing the admixture to settle, thereby forming a phase containing sulfuric acid and a phase comprising the hydrocarbon solution of oil-soluble acids, sulfonic acids,
   e. recovering the phase containing the hydrocarbon solution of oil-soluble sulfonic acids, said method being characterized further in that said volatile, non-aromatic hydrocarbon boils below about 150°C.

4. The method of claim 3 wherein said mixture of 2-methoxyethanol and water contains from about 25 to about 75 volume percent 2-methoxyethanol, 5. The method of claim 4 wherein 2-methoxyethanol is used in an amount in the range of from about 0.5 to about 2 volume percent, 6. A method of purifying crude oil-soluble sulfonic acids, whereby sulfuric acid and sulfur oxides are removed therefrom, wherein the method comprises:
   a. adding to a volatile, non-aromatic hydrocarbon solution of crude oil-soluble sulfonic acids an effective amount, in the range of about 0.25 to about 5 volume percent, based on said hydrocarbon solution of crude sulfonic acids, of 2-methoxyethanol or a mixture of 2-methoxyethanol and water which mixture contains from about 15 to about 85 volume percent of 2-methoxyethanol,
   b. agitating the admixture of step (a),
   c. allowing the admixture to settle, thereby forming a phase containing sulfuric acid and a phase comprising the hydrocarbon solution of oil-soluble sulfonic acids,
   d. recovering the phase comprising the hydrocarbon solution of oil-soluble sulfonic acids, and
   e. heating the hydrocarbon solution of oil-soluble sulfonic acids sufficiently to remove therefrom from about 1 to about 10 volume percent of the volatile materials, said method being characterized further in that said volatile, non-aromatic hydrocarbon boils below about 150°C.

7. The method of claim 6 wherein said mixture of 2-methoxyethanol and water contains from about 25 to about 75 volume percent 2-methoxyethanol, 8. The method of claim 7 wherein 2-methoxyethanol is used in an amount in the range of from about 0.5 to about 2 volume percent, 9. The method of claim 8 wherein the volatile, non-aromatic hydrocarbon solvent is hexane, 10. The method of claim 6 wherein the heating step (e) is conducted at a temperature in the range of about 60° to about 77°C., 11. The method of claim 10 wherein 2-methoxyethanol is used in the range of from about 0.5 to about 2 volume percent, 12. The method of claim 11 wherein the volatile, non-aromatic hydrocarbon solvent is hexane.

* * * * *